United States Patent [19]

Barbagli et al.

[11] Patent Number: 4,561,513
[45] Date of Patent: Dec. 31, 1985

[54] STEERING DEVICE FOR A HYDROSTATIC-DRIVE VEHICLE, IN PARTICULAR A CRAWLER-MOUNTED EARTH-MOVING MACHINE

[75] Inventors: Rino O. Barbagli, Borgaretto; Gaetano Marras, Vinovo, both of Italy

[73] Assignee: Fiat Allis Europe S.p.A., Turin, Italy

[21] Appl. No.: 622,119

[22] Filed: Jun. 19, 1984

[30] Foreign Application Priority Data

Jul. 11, 1983 [IT] Italy ............................... 67751 A/83

[51] Int. Cl.⁴ ............................................. B62D 11/04
[52] U.S. Cl. ..................................... 180/6.48; 91/517; 137/87
[58] Field of Search ................... 60/423, 426; 91/517, 91/518, 530; 137/87; 180/6.48

[56] References Cited

U.S. PATENT DOCUMENTS 3,154,925 11/1964 DeVita ................................. 60/426
3,717,213 2/1973 Roe ................................... 180/6.48
4,458,485 7/1984 Seelman .......................... 180/6.48 X Primary Examiner—Robert G. Nilson
Attorney, Agent, or Firm—Morgan, Finnegan, Pine, Foley & Lee

[57] ABSTRACT

An hydraulic steering device for a crawler-mounted vehicle, in which a couple of pressure-regulating steering valves controls the rotation direction and speed of two respective rolling trains of the vehicle, is described. Each of the valves is provided with an end chamber having a piston sliding therein in response to a control pressure depending on the pilot pressure regulated by the other steering valve, and each piston is designed to shift respective shouldering means for respective contrast springs of respective shuttles provided on the valves in such a manner that both the rolling trains are stopped whenever both of the valves are activated simultaneously.

8 Claims, 2 Drawing Figures

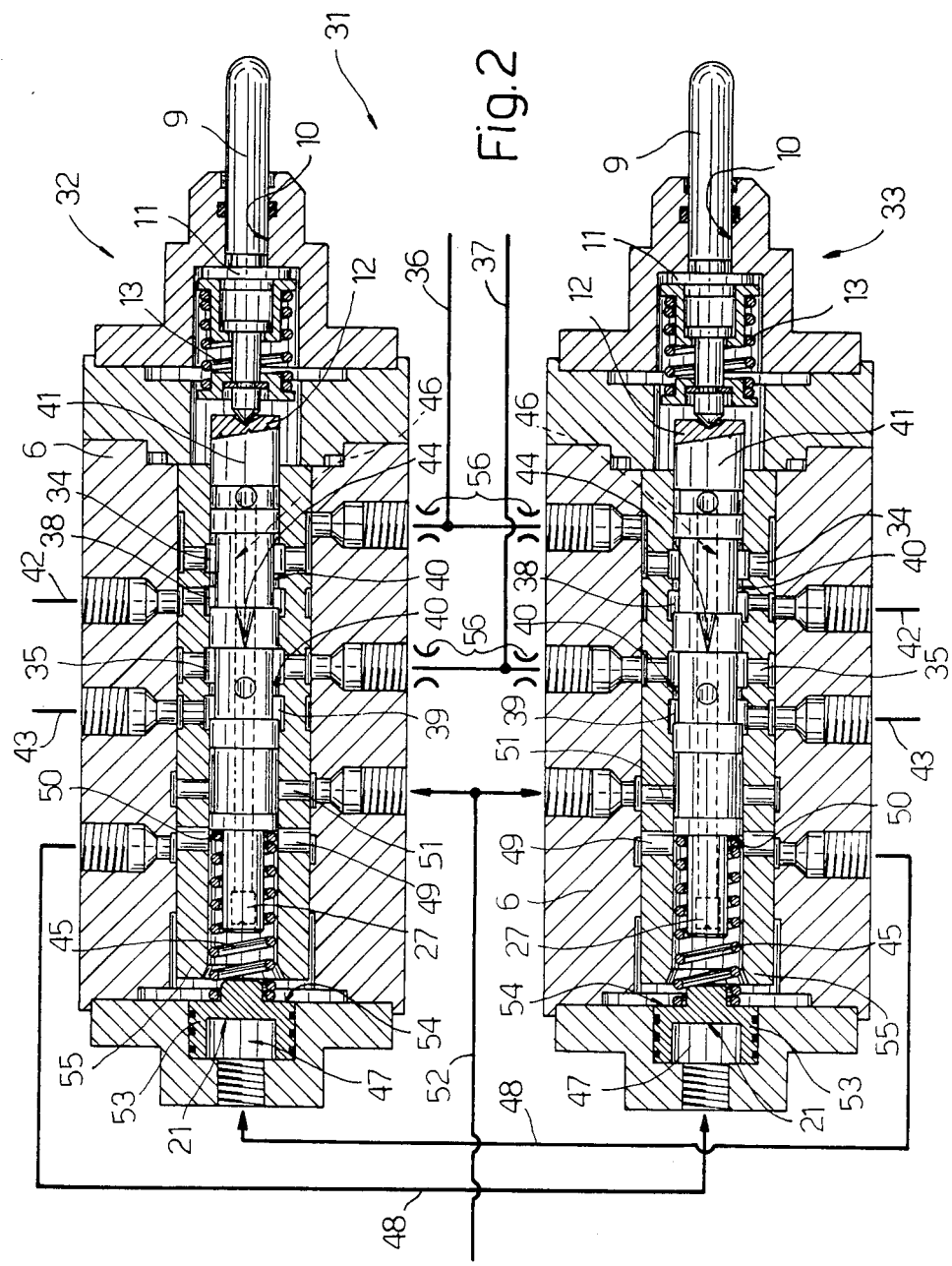

600
STEERING DEVICE FOR A HYDROSTATIC-DRIVE VEHICLE, IN PARTICULAR A CRAWLER-MOUNTED EARTH-MOVING MACHINE

BACKGROUND OF THE INVENTION

The present invention relates to a steering device for a hydrostatic-drive vehicle, in particular, a crawler-mounted earth-moving machine, for preventing simultaneous counter-rotation of both rolling trains on the vehicle.

The steering device on hydrostatic-drive vehicles, such as crawler tractors and/or earth-moving machinery, is known to comprise two pressure-regulating steering valves each designed to control a pilot pressure regulating the rotation speed and direction of a respective rolling train on the vehicle. Appropriate mechanical devices connecting the two steering valves prevent simultaneous counter-rotation of both rolling trains when both steering valve control pedals are pressed simultaneously. Besides being cumbersome, these known types of mechanical devices are also complex and/or expensive to manufacture.

SUMMARY OF THE INVENTION

It is an object of the present invention to provide a hydraulic steering device for a hydrostatic-drive vehicle which does not exhibit the above-mentioned drawbacks and, in particular, one designed to prevent simultaneous counter-rotation of both rolling trains on the vehicle using exclusively hydraulic means, with the need for mechanical connections between the shuttles or pedals on the two steering valves. With this aim in view, the present invention relates to a steering device for a hydrostatic-drive vehicle, in particular, a crawler-mounted earth-moving machine, designed to prevent simultaneous counter-rotation of both rolling trains on the vehicle and comprising a pair of pressure-regulating valves, each designed to control a pilot pressure for controlling the rotation direction and speed of a respective rolling train on the vehicle; the valves comprising a body in which a shuttle moves axially against first flexible means, the shuttle being designed to be activated by mechanical control means and characterised by the fact that the body of each steering valve is provided with an end chamber housing an axially-moving piston integral with shouldering means for the first flexible means and designed to shift against the first flexible means, the shouldering means. The device also comprises means for exerting, on an active surface of the piston of each steering valve, a control pressure depending on the pilot pressure regulated by the other steering valve, and stroke limiting means for stopping the pistons in such an axial position that, when one piston is activated by the control pressure, the respective steering valve determines a constant pilot pressure for stopping the respective rolling train.

BRIEF DESCRIPTION OF THE DRAWINGS

Two arrangements of the present invention will now be described, by way of non-limiting examples, with reference to the attached drawings in which:

FIG. 2 shows a second arrangement of the FIG. 1 device.

DETAILED DESCRIPTION OF THE INVENTION

Figure 1:
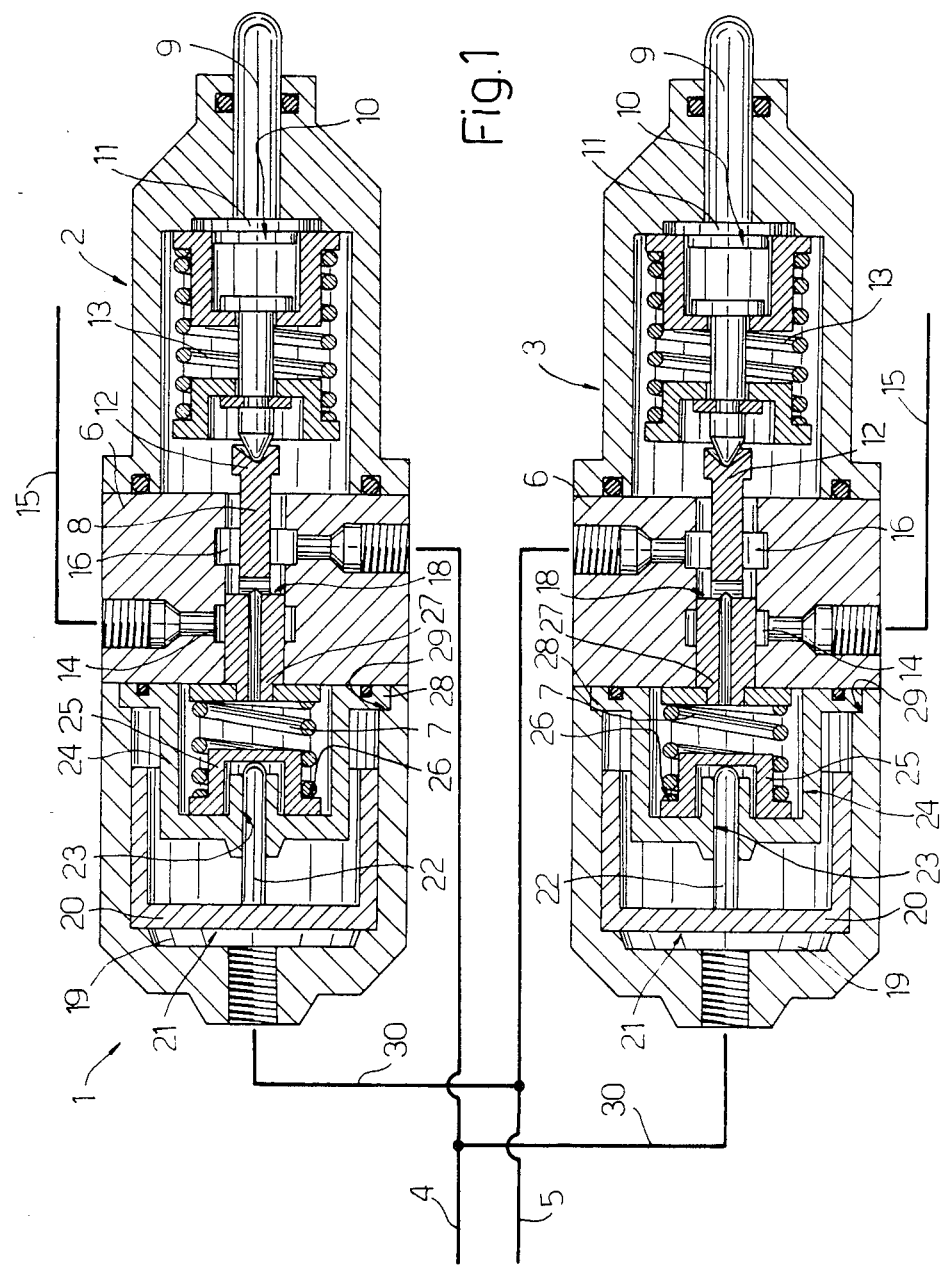
FIG. 1 shows a first arrangement of a hydraulic steering device according to the present invention.

Number 1 in FIG. 1 indicates a steering device for a vehicle (not shown) fitted with any known type of hydrostatic drive, in particular, a crawler-mounted earth-moving machine, on which the vehicle rolling trains, tracks or wheels, are operated by hydraulic motors controlled by respective pumps, in turn, piloted by hydraulic regulating and/or switch valves hand- and/or foot-operated by the driver, usually by means of pedals and/or control sticks. Device 1 is of the known type comprising a pair of pressure-regulating steering valves 2 and 3, also of known type, designed to control a pilot pressure in respective ducts 4 and 5, the pilot pressure being designed to control the rotation direction and speed of a respective rolling train (not shown) on the vehicle in a proportional manner, that is, to slow down rotation of the rolling train gradually to a dead stop and then reverse rotation as pilot pressure is varied (up and down) gradually. As valves 2 and 3 are identical, to simplify matters, only one will be described. Valve 2 comprises a body 6 in which a known type of shuttle 8 moves axially against flexible means 7 consisting of a helical spring, the shuttle 8 being activated mechanically by a push rod 9 coaxial with shuttle 8 and housed in sliding manner in seat 10 of body 6, the seat being connected to an atmospheric-pressure outlet. One end of push rod 9 engages with a known type of control pedal (not shown) on the said vehicle and between head 11 on push rod 9 and end 12, facing head 11, on shuttle 8, provision is made for the insertion of a helical spring 13, preferably preloaded and designed to transmit the initial axial movement of push rod 9 to shuttle 8. Valve 2 is provided with a supply chamber 14, connected to duct 15 designed to be connected to a source of fluid under pressure (not shown), e.g. a pump, and a utility chamber 16 connected to duct 4 or 5 in the case of valve 3. Ducts 4 and 5 are designed to be connected, for example, to respective pumps for operating respective rolling trains on the vehicle and are designed for transmitting to the pumps the pilot pressure regulated by valves 2 and 3, shuttle 8 of each being designed, following a short initial stroke for overlap recovery, to control a communicating gap 18 between chambers 14 and 16 as a result of displacement of relative push rod 9 following operation of one of the steering pedals on the vehicle. Operation of the abovementioned type of steering device is already known. To steer the vehicle rightwards, for example, the right steering pedal is pressed so as to shift push rod 9. Shuttle 8 moves into a balanced position from which to control gap 18 by gradually increasing the pilot pressure in respective duct 4 or 5 in response to variation in the elastic forces caused by the loads exerted on springs 13 and 7 (following gradual displacement of push rod 9). As the pilot pressure increases, rotation of the respective rolling train drops in speed until, at a preset pressure point, it is stopped and inverted by the next pressure point up.

According to the present invention, device 1 is designed to prevent simultaneous counter-rotation of both rolling trains on the vehicle. To do this, body 6 on each valve 2 and 3 is provided with an end chamber 19 housing an axially-moving piston 20 having an active surface 21 and, on the opposite side, a shank 22 sliding axially in the seat 23 of a cup-shaped element 24 housed in chamber 19 behind piston 20 and itself housing a bushing 25 coaxial with piston 20 and shank 22 and engaging with the latter so as to move integral with piston 20. Bushing 25 is provided with a front surface 26 coaxial with and facing end 27 on shuttle 8, opposite end 12, and designed to engage with spring 7 located between the latter and end 27. Surface 26 thus constitutes a moving shoulder for spring 7, designed to move, integral with piston 20 when the latter is activated, towards collar 28 integral with cup element 24 and clamped axially in seat 29 of body 6. Collar 28 is of preset thickness and designed to stop piston 20 in such a position as to enable bushing 25, which moves integral with piston 20, to steady shuttle 8 in such a position of balance as to produce the pilot pressure required for stopping the respective rolling train, thus preventing the relative valve 2 or 3, in the event of further displacement of push rod 9, from commencing counter-rotation of the rolling train under its control. Clearly, displacement of surface 26 varies (increases) the preload on spring 7 to such an extent as to prevent the elastic load, caused by deformation of spring 13, from varying the dynamic balance of shuttle 8, so as to increase further the pressure in chamber 14.

According to the present invention, piston 10 on each valve 2 or 3 is operated automatically via respective ducts 30 branch connected permanently to ducts 4 and 5 respectively and coming out inside chambers 19 of valves 3 and 2 respectively. In this way, branch ducts 30 transmit to chamber 19 of valve 2 the pilot pressure generated by valve 3 and existing in duct 5 and, vice versa, transmit to chamber 19 of valve 3 the pilot pressure generated by valve 2 and existing in duct 4. Consequently, active surfaces 21 on each piston 20 of each steering valve 2 and 3 are subjected to a control pressure depending on the pilot pressure regulated by the other steering valve. The area of surfaces 21 is such as to displace piston 20 against collar 28 when control pressure is below the pilot pressure stopping the rolling train. Clearly, therefore, if both steering pedals are pressed simultaneously, enough pressure is supplied to each of chambers 19 to shift piston 20 against collar 28 and stop both rolling trains. The same applies even if the vehicle is already being steered in one direction and, whether accidentally or otherwise, the driver operates the other steering valve as well. In the event of this happening, operation of the second steering valves causes a gradually increasing pressure to be supplied to chamber 19 on the first valve, which shifts piston 20 so as to increase the load on spring 7 and eventually stop the respective rolling train, together with the train controlled by the second valve the counter-rotation function of which has already been disabled by prior operation of the first valve for steering the vehicle.

Number 31 in FIG. 2 indicates a steering device which differs from device 1 as to the type of steering valves 32 and 33 employed. Valves 32 and 33 are known types of pressure-regulating valves on which part of the fluid under pressure supplied to the valve is drained off. As valves 32 and 33 are identical, only one will be described using the same numbering system for parts similar to those already mentioned. Valve 32 (or 33) is provided with two chambers 34 and 35 connected respectively to pipes 36 and 37 which may be connected alternatively, by means of a known type of operating device (not shown), to a source of fluid under pressure, e.g. a pump, or a drain, e.g. an atmospheric-pressure tank. Valve 32 comprises two chambers 38 and 39 connected respectively to chambers 34 and 35 through respective gaps 40, the aperture of which is controlled by the axial position of shuttle 41, and respectively to control pipes 42 and 43 which are designed to activate a respective rolling train on the vehicle by supplying it with a pilot pressure depending on the axial position of shuttle 41, the latter being designed to open gap 44 between chambers 34 and 35 gradually as it moves axially against spring 45 following operation of one of the steering pedals on the vehicle (not shown) via a mechanical control system identical to that of valves 2 and 3. Operation of such a valve is already known. For example, suppose the operating device is set so as to pressurize pipe 36 and connect pipe 37 to the drain, displacement of shuttle 41 gradually places chamber 34 in communication with chamber 35 and, in doing so, gradually reduces the pilot pressure which is transmitted to chamber 38 and, from there, to pipe 42. Pipe 43 and chamber 39 are thus connected to the drain in which condition, for example, rotation of the rolling train gradually slows down in speed, eventually stopping when shuttle 41 reaches a preset position in which gap 44, being fully open, creates the same pilot pressure in both chambers 38 and 39 with the assistance of choke 56 on the mouth of both ducts 36 and 37. Starting from a preset axial position immediately following the one mentioned above, further axial displacement of shuttle 41 against spring 45 closes gaps 40 and connects chambers 39 and 34 via hole 46 on shuttle 41, thus pressurizing pipe 43, draining pipe 42 and inverting the rotation direction of the rolling train. Each of valves 32 and 33 is provided with an end chamber 47 connected, via a respective pipe 48, to a respective chamber (49) on the other steering valve, the said chamber 49 being in turn connected, via gap 50, to a further chamber 51 connected to a pipe 52 in turn connected to a source of fluid under pressure, e.g. the same pump supplying fluid under pressure to the operating device, and, from this, to duct 36 (or 37). Shuttle 41 is designed to open gap 50 in the same preset axial position in which shuttle 41 fully opens gap 44 to stop the respective rolling train, so as to pressurize chamber 49 and, via respective pipe 48, pressurize chamber 47 on the other steering valve. Chamber 47 on each steering valve houses an essentially-cup-shaped sliding piston 53 with its concave side facing the inlet of pipe 48 and having a rear face 54 designed to engage with end 27 on shuttle 41 so as to stop the latter prior to the end of its stroke. Surface 54 is designed to act as a moving shoulder for spring 45 and to engage with annular shoulder 55 integral with body 6, the latter being arranged so as to stop piston 53 in an axial position enabling surface 54 to clamp shuttle 41 in the preset axial position in which the respective rolling train is stopped and gap 50 is open. Clearly, therefore, operating valve 32, for example, gradually opens gap 44 and commences steering of the vehicle. Continuing its travel, shuttle 41 opens gap 50 so as to pressurize chamber 47 on valve 33 and force piston 53 on the latter against shoulder 55. If, accidentally or otherwise, valve 33 is operated as well, shuttle 41 on the valve is stopped by surface 54 just before the respective rolling train can be counter-rotated while, at the same time, the respective gap 50 on valve 33 opens to pressurize chamber 47 on valve 32 so as to shift shuttle 41 on the said valve 32 against spring 13 and so stop the other rolling train as well.

The advantages—simplicity, low cost and compactness—of the present invention will be clear from the description given. To those skilled in the art it will be clear that changes can be made to the steering device described, by way of non-limiting examples, without, however, departing from the scope of the present invention.

I claim:

1. A steering device for a hydrostatic-drive vehicle provided with a pair of rolling trains and for preventing simultaneous counter-rotation of both of said rolling trains on said vehicle which comprises a pair of pressure-regulating steering valves which control a pilot pressure for controlling the rotation direction and speed of a respective rolling train on said vehicle, each of said steering valves comprising a body, a shuttle located in said body which moves axially against first flexible means and which is activated by mechanical control means, the body of each of said steering valves being provided with an end chamber housing an axially-moving piston which cooperates with shouldering means for said first flexible means and to shift against said first flexible means the said shouldering means, means for exerting on an active surface of the piston of each of said steering valves, a control pressure depending on the pilot pressure which is regulated by the other steering valve, and stroke limiting means for stopping said pistons in such an axial position that, when one of said pistons is activated by said control pressure, the respective steering valve determines a constant pilot pressure for stopping the respective rolling train.

2. A device according to claim 1 wherein the mechanical control means for each steering valve comprises a push rod, including a head, which is slidable coaxially with the shuttle located in the body and housed in a seat thereon, said push rod being engageable with a control pedal on the vehicle, and second flexible means, located between a first end of said shuttle and the head of said push rod, which transmits the axial movement of said push rod to said shuttle and provides slack adjustment between said final end of said shuttle and the surface of the head of said push rod facing said shuttle.

3. A device according to claim 1 wherein each steering valve includes a supply chamber connected to a first duct that is connected to a source of fluid under pressure, and a utility chamber connected to a second duct for transmitting the pilot pressure to and activating the respective rolling trains on the vehicle, the shuttle controlling a gap connecting said supply and utility chambers, so as to gradually increase said pilot pressure, gradually slow down, and, at a preset pilot pressure invert rotation of the respective rolling trains, and the means for exerting the control pressure on the active surface of the piston of each control valve comprising a third duct permanently branch connected to said second duct and opening into the end chamber on the other steering valve and exerting on the active surface of the respective piston thereof which is under control pressure, the pilot pressure existing in said second duct.

4. A device according to claim 1 wherein the shouldering means comprises a bushing which faces and is coaxial with a second end of the shuttle located opposite a first end thereof, and engages a shank which is integral with the piston and with which piston said bushing is also coaxial, and the first flexible means is located between the second end of said shuttle and said bushing.

5. A device according to claim 1 wherein the stroke limiting means comprises a cup-shaped element located in the end chamber which houses a bushing and said cup-shaped element is provided with a guide seat for guiding a shank integral with the piston and a collar of present thickness clamped in a seat on the body, said collar stopping said piston in a position which enables the shouldering means integral with said piston to exert a preload on the first flexible means sufficient to bring the shuttle into a position of balance in which a pilot pressure just below the present pressure at which the respective rolling train is stopped is determined in a duct on said body connecting a utility chamber therein with said respective rolling train.

6. A device according to claim 1 wherein each steering valve is provided with a first chamber and a second chamber which are coaxial with each other and are connected, respectively, to a first pipe and a second pipe which are connected alternatively through operating means to a source of fluid under pressure or to a drain, each steering valve being further provided with a third chamber and a fourth chamber connected respectively to said first and second chambers via two gaps, the aperture of said gaps being controlled by the shuttle and connected respectively to a pair of pipes for transmitting a pilot pressure to a respective rolling train on the vehicle, the shuttle opening a communicating gap between said first and second chambers gradually as it moves against the first flexible means, reducing the pilot pressure gradually and slowing down rotation of the respective rolling train and also, starting from a preset axial position to close the gaps connecting said first and third and second and fourth chambers and to connect said fourth chamber with said first chamber and reversing rotations of the respective rolling train, the means for exerting the control pressure on the active surface of the piston on each of said valves comprising a third pipe connected to a fifth chamber on each valve and to the end chamber of the other valve, and each of said steering valves also having a sixth chamber connected via a fourth pipe to a source of fluid under pressure and a gap for connecting said fifth and sixth chambers, said gap being opened by said shuttle when said shuttle moves into a second present axial position immediately prior to the preset axial position in which rotation of the respective rolling train is inverted, and the pilot pressure in said second present axial position being essentially equal to the pressure of said drain or said source of fluid so as to stop the rotation of said respective rolling train.

7. A device according to claim 6 wherein the shouldering means includes a near face on the piston which engages a second end on the shuttle disposed opposite the first end thereof which stops the travel of the first end thereof.

8. A device according to claim 1 wherein the stroke limiting means comprises an annular shoulder integral with the body which engages the near face of the piston stopping said piston in an axial position which enables said near face to clamp the shuttle in a second present axial position.

* * * * *